United States Patent
Futaki et al.

(10) Patent No.: US 12,069,521 B2
(45) Date of Patent: Aug. 20, 2024

(54) RADIO ACCESS NETWORK NODE, RADIO TERMINAL, AND METHOD THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 480 days.

(21) Appl. No.: 17/420,334

(22) PCT Filed: Oct. 31, 2019

(86) PCT No.: PCT/JP2019/042918
§ 371 (c)(1),
(2) Date: Jul. 1, 2021

(87) PCT Pub. No.: WO2020/144918
PCT Pub. Date: Jul. 16, 2020

(65) Prior Publication Data
US 2022/0070740 A1    Mar. 3, 2022

(30) Foreign Application Priority Data
Jan. 11, 2019   (JP) ................................. 2019-003561

(51) Int. Cl.
*H04W 36/00*   (2009.01)
*H04W 36/08*   (2009.01)

(52) U.S. Cl.
CPC ....... *H04W 36/0061* (2013.01); *H04W 36/08* (2013.01)

(58) Field of Classification Search
CPC ......... H04W 36/0061; H04W 36/0077; H04W 36/08; H04W 36/36
See application file for complete search history.

(56) References Cited

U.S. PATENT DOCUMENTS

2009/0318155 A1   12/2009   Fukuzawa et al.
2012/0142357 A1   6/2012   Aminaka
(Continued)

FOREIGN PATENT DOCUMENTS

CN   108243469 A   7/2018
CN   108632926 A   10/2018
(Continued)

OTHER PUBLICATIONS

3GPP TS 38.423 V15.1.0 (Sep. 2018) 3rd Generation Partnership Project; Technical Specification Group Radio Access Network; NG-RAN; Xn application protocol (XnAP) (Release 15) (Year: 2018).*

(Continued)

*Primary Examiner* — Gary Mui

(57) ABSTRACT

During a mobility procedure for moving a radio terminal (3) from a source cell (11) to one of candidate target cells (21-23), a target RAN node (2) transmits to the radio terminal (3), via a source RAN node (1), a first configuration common to the candidate target cells and a plurality of second configurations each associated with a respective one of the candidate target cells. The first configuration includes at least one configuration parameter for enabling the radio terminal (3) to access to one of the candidate target cells or to communicate therein. Each second configuration includes at least one configuration parameter for enabling the radio terminal (3) to access to the corresponding candidate target cell or to communicate therein. This contributes to, for example, reducing signaling overhead of an inter-RAN node interface (and an air interface) during various mobility procedures including handovers.

2 Claims, 8 Drawing Sheets

(56) References Cited

U.S. PATENT DOCUMENTS

| | | | |
|---|---|---|---|
| 2014/0301368 | A1 | 10/2014 | Chen et al. |
| 2019/0387438 | A1* | 12/2019 | Chang .................. H04W 36/36 |
| 2020/0059847 | A1* | 2/2020 | Lin .................. H04W 36/0058 |
| 2020/0396660 | A1* | 12/2020 | Wu ....................... H04W 76/30 |
| 2020/0396661 | A1* | 12/2020 | Wu .................. H04W 36/0058 |
| 2021/0058836 | A1* | 2/2021 | Kimba Dit Adamou .................... H04W 36/0058 |
| 2021/0337443 | A1* | 10/2021 | Chang ............... H04W 36/0083 |
| 2021/0360495 | A1* | 11/2021 | Lovlekar ......... H04W 36/00837 |

FOREIGN PATENT DOCUMENTS

| | | |
|---|---|---|
| JP | 2010-004295 A | 1/2010 |
| WO | 2011/018890 A1 | 2/2011 |
| WO | 2018/156696 A1 | 8/2018 |

OTHER PUBLICATIONS

Japanese Office Action for JP Application No. 2022-164762 mailed on Nov. 1, 2022 with English Translation.
LG Electronics Inc., Support of DC based handover with conditional handover for 0ms interruption, 3GPP TSG RAN WG2#101, R2-1802541, Feb. 14, 2018.
ZTE Corporation, Evaluation of solutions on service interruption enhancement, 3GPP TSG-RAN WG2#93bis, R2-162565, Apr. 1, 2016.
MediaTek Inc., Performance Evaluation and Implication for Conditional HO, 3GPP TSG RAN WG2#104, R2-1816960, Nov. 2, 2018.
JP Office Action for JP Application No. 2022-145961, mailed on Jun. 20, 2023 with English Translation.
ETRI, "Considerations on Conditional Handover", 3GPP TSG RAN WG2#104 R2-1818047, Nov. 2, 2018.
Extended European Search Report for EP Application No. EP19908616.6 dated on Feb. 3, 2022.
Astri et al., "Discussion on Conditional Handover in NR", 3GPP TSG-RAN WG2 Meeting #101, R2-1802008, Athens, Greece, Feb. 12, 2018, pp. 1-6.
Qualcomm Europe, "Connected mode mobility in the presence of PCI confusion for HeNBs", 3GPP TSG-RAN WG2 meeting #65bis, R2-092113, Seoul, Korea, Mar. 16, 2009.
JP Office Action for JP Application No. 2020-565591, mailed on May 17, 2022 with English Translation.
Ericsson, "Neighbour relation establishment in NR", 3GPP TSG-RAN WG2#95bis R2-166926, Oct. 1, 2016.
Ericsson, "Conditional handover in LTE", 3GPP TSG RAN WG2 #103bis R2-1814319, Sep. 27, 2018.
Japanese Office Action for JP Application No. 2020-565591 mailed on Jul. 19, 2022 with English Translation.
International Search Report for PCT Application No. PCT/JP2019/042918, mailed on Dec. 17, 2019.
Intel Corporation, "Discussion of conditional handover", 3GPP TSG RAN WG2 Meeting #104, R2-1816691, Nov. 8-12, 2018, Spokane, USA, pp. 1-4.
MediaTek Inc., "Conditional Handover Procedures", 3GPP TSG-RAN WG2 Meeting #104, R2-1816959, Nov. 12-16, 2018, Spokane, WA, USA, pp. 1-6.
Huawei et al., "Analysis on conditional handover", 3GPP TSG-RAN WG2 #97bis, R2-1703384, Apr. 3-7, 2017, Spokane, USA.
Huawei et al., "Allocation of appropriate RACH resources for handover", 3GPP TSG-RAN WG2 #99, R2-1708883, Aug. 21-25, 2017, Berlin, Germany.
Huawei et al., "TP for TS 38.300 on inter-RAT handover", 3GPP TSG-RAN2 Meeting #101bis, R2-1806386, Apr. 16-20, 2018, Sanya, China, pp. 1-3.
InterDigital, "Minimizing the Non-Synchronized RACH Procedure Requirement During LTE Handover", 3GPP TSG RAN2 #57, R2-070671, Feb. 12-16, 2007, St. Louis, USA, pp. 1-13.
LG Electronics Inc., "Dedicated priority handling at PLMN selection", 3GPP TSG-RAN2 Meeting #65bis, R2-092345, Mar. 23-27, 2009, Seoul, Korea, pp. 1-2.
CN Office Action for CN Application No. 201980093316.0, mailed on Jan. 1, 2024 with English Translation.

* cited by examiner

Fig. 3

HANDOVER REQUEST

| IE / Groupe Name | Presence | Range | IE Type and reference | Semantics description |
|---|---|---|---|---|
| Message Type | M | | 9.2.3.1 | |
| Source NG-RAN node UE XnAP ID reference | M | | NG-RAN node UE XnAP ID 9.2.3.16 | Allocated at the source NG-RAN node |
| Cause | M | | 9.2.3.2 | |
| Target Cell Global ID | M | | ECGI 9.2.14 | Includes either an E-UTRA CGI or an NR CGI |
| Candidate Target Cell List | O | | 9.2.X | |
| >Candidate Target Cell List Item | M | 1..<maxnoof TargetCells> | | |
| >>Target Cell Global ID | M | | | |
| ---- | | | | |
| GUAMI | M | | 9.2.3.24 | |
| UE Context Information | M | 1 | | |
| ---- | | | | |

Fig. 4

HANDOVER REQUEST ACKNOWLEDGE

| IE / Groupe Name | Presence | Range | IE Type and reference | Semantics description |
|---|---|---|---|---|
| Message Type | M | | 9.2.13 | |
| Source NG-RAN node UE XnAP ID | M | | NG-RAN node UE XnAP ID 9.2.3.16 | Allocated at the source NG-RAN node |
| Target NG-RAN node UE XnAP ID | M | | NG-RAN node UE XnAP ID 9.2.3.16 | Allocated at the target NG-RAN node |
| ----- | | | | |
| Target NG-RAN node To Source NG-RAN node Transparent Container | M | | OCTET STRING | |
| ----- | | | | |
| Target Cell Admitted List | O | | | |
| >*Target Cell Admitted List Item* | M | *1..<maxnoof TargetCells>* | | |
| >>Target Cell Global ID | M | | | |
| ----- | | | | |

RADIO ACCESS NETWORK NODE, RADIO TERMINAL, AND METHOD THEREFOR

This application is a National Stage Entry of PCT/JP2019/042918 filed on Oct. 31, 2019, which claims priority from Japanese Patent Application 2019-003561 filed on Jan. 11, 2019, the contents of all of which are incorporated herein by reference, in their entirety.

TECHNICAL FIELD

The present disclosure relates to a radio communication system and, in particular, to handovers.

BACKGROUND ART

Patent Literatures 1 and 2 discloses that a handover request message sent from a source radio access network (RAN) node (e.g., base station) to a target RAN node during a handover procedure includes a list of a plurality of candidate target cells. Patent Literature 2 further discloses that when a plurality of candidate target cells can admit a handover, the target RAN node returns to a source RAN node a handover acknowledge message which includes handover information regarding the plurality of candidate target cells.

Non Patent Literatures 1 and 2 disclose a conditional handover (CHO) being discussed in the 3GPP. In some implementations for CHO, a source RAN node (e.g., eNodeB (eNB)) transmits a handover command including a handover execution condition (e.g., threshold) to a radio terminal (e.g., User Equipment (UE)). The radio terminal maintains the connection with the source RAN node even after receiving the handover command, and initiates access to the target RAN node as soon as the condition configured by the handover command is satisfied. That is, the conditional handover (CHO) is different from existing handovers in that the radio terminal initiates access to the target cell not in response to receiving the handover command, but in response to the satisfaction of the condition configured by the handover command.

The CHO can improve the reliability of delivery of the handover command to the UE by early event triggering (i.e., lowering a threshold for triggering a measurement report by the radio terminal). This allows the CHO to reduce a handover failure rate.

In CHO, a configuration of a plurality of candidate target cells may be sent to the radio terminal. The candidate target cells may be referred to as potential target cells. For example, the radio terminal receives a handover command including configurations of a plurality of candidate target cells and a CHO execution threshold from a source RAN node (e.g., eNB). The radio terminal measures the configured candidate target cells and, when the measurement in any candidate target cell meets the CHO execution threshold, initiates access to this candidate cell.

CITATION LIST

Patent Literature

[Patent Literature 1] JP 2010-004295 A
[Patent Literature 2] WO 2011/018890 A1

Non Patent Literature

[Non Patent Literature 1] Intel Corporation, "Discussion of conditional handover", R2-1816691, 3GPP TSG RAN WG2 Meeting #104, Spokane, WA, USA, Nov. 12-16, 2018

[Non Patent Literature 2] MediaTek Inc., "Conditional Handover Procedures", R2-1816959, 3GPP TSG RAN WG2 Meeting #104, Spokane, WA, USA, Nov. 12-16, 2018

SUMMARY OF INVENTION

Technical Problem

If the target RAN node sends a plurality of configurations for respective candidate target cells to the source RAN node, or to the radio terminal via the source RAN node, it causes increasing of signaling overhead of an inter-RAN node interface (e.g., X2 interface) or signaling overhead of both an inter-RAN node interface and an air interface (between the source base station and the radio terminal).

One of the objects to be attained by embodiments disclosed herein is to provide apparatuses, methods, and programs that contribute to reducing signaling overhead of an inter-RAN node interface (and an air interface) during various mobility procedures including handovers. It should be noted that this object is merely one of the objects to be attained by the embodiments disclosed herein. Other objects or problems and novel features will be made apparent from the following description and the accompanying drawings.

Solution to Problem

In a first aspect, a target radio access network node includes at least one memory and at least one processor coupled to the at least one memory. The at least one processor is configured to, during a mobility procedure for moving a radio terminal from a source cell to one of a plurality of candidate target cells, transmit to the radio terminal, via a source RAN node managing the source cell, a first configuration common to the plurality of candidate target cells and a plurality of second configurations each associated with a respective one of the plurality of candidate target cells. The first configuration includes at least one configuration parameter for enabling the radio terminal to access to one of the plurality of candidate target cells or to communicate therein. Each second configuration includes at least one configuration parameter for enabling the radio terminal to access to the corresponding candidate target cell or to communicate therein.

In a second aspect, the radio terminal includes at least one memory and at least one processor coupled to the at least one memory. The at least one processor is configured to, during a mobility procedure for moving a radio terminal from a source cell to one of a plurality of candidate target cells, receive from a target RAN node managing the plurality of candidate target cells, via a source RAN node managing the source cell, a first configuration common to the plurality of candidate target cells and a plurality of second configurations each associated with a respective one of the plurality of candidate target cells. The first configuration includes at least one configuration parameter for enabling the radio terminal to access to one of the plurality of candidate target cells or to communicate therein. Each second configuration includes at least one configuration parameter for enabling the radio terminal to access to the corresponding candidate target cell or to communicate therein.

In a third aspect, a method for a target radio access network node including: during a mobility procedure for moving a radio terminal from a source cell to one of a plurality of candidate target cells, transmitting to the radio terminal, via a source RAN node managing the source cell, a first configuration common to the plurality of candidate target cells and a plurality of second configurations each associated with a respective one of the plurality of candidate target cells. The first configuration includes at least one configuration parameter for enabling the radio terminal to access to one of the plurality of candidate target cells or to communicate therein. Each second configuration includes at least one configuration parameter for enabling the radio terminal to access to the corresponding candidate target cell or to communicate therein.

In a fourth aspect, a method for a radio terminal including: during a mobility procedure for moving a radio terminal from a source cell to one of a plurality of candidate target cells, receiving from a target RAN node managing the plurality of candidate target cells, via a source RAN node managing the source cell, a first configuration common to the plurality of candidate target cells and a plurality of second configurations each associated with a respective one of the plurality of candidate target cells. The first configuration includes at least one configuration parameter for enabling the radio terminal to access to one of the plurality of candidate target cells or to communicate therein. Each second configuration includes at least one configuration parameter for enabling the radio terminal to access to the corresponding candidate target cell or to communicate therein.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide apparatuses, methods, and programs that contribute to reducing signaling overhead of an inter-RAN node interface (and an air interface) during various mobility procedures including handovers.

BRIEF DESCRIPTION OF DRAWINGS

FIG. 3 is a diagram showing a specific example of a format of HANDOVER REQUEST message according to a second embodiment;

FIG. 4 is a diagram showing a specific example of a format of HANDOVER REQUEST ACKNOWLEDGE message according to the second embodiment;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP Long Term Evolution (LTE) systems and 5G systems. However, these embodiments may be applied to other radio communication systems supporting a handover of a radio terminal. Note that, the term "LTE" used in this specification includes enhancement/evolution of LTE and LTE-Advanced to provide interworking with the 5G System, unless otherwise specified. The 5G system includes a network deployment in which an LTE eNodeB (eNB) is connected to a 5G core network (5GC). This eNB may be referred to as Next generation (ng)-eNB. The ng-eNB may also be referred to as eNB/5GC, which means an eNB connected to a 5GC.

First Embodiment

Figure 1:
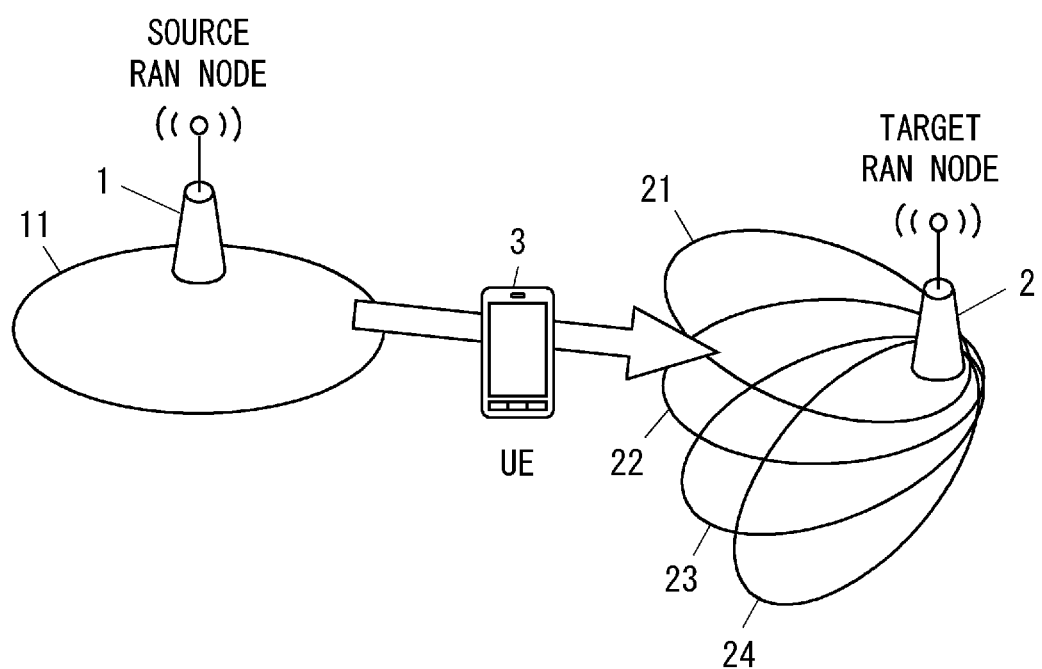
FIG. 1 is a diagram showing a configuration example of a radio communication network according to embodiments.

FIG. 1 shows a configuration example of a radio communication network according to embodiments including this embodiment. In the example shown in FIG. 1, the radio communication network includes a RAN node 1, a RAN node 2, and a radio terminal 3.

The RAN node 1 may be, for example, an LTE eNodeB (eNB) or an NR gNodeB (gNB). The RAN node 1 may include a Central Unit (e.g., eNB-CU, or gNB-CU) and one or more Distributed Units (e.g., eNB-DUs, or gNB-DUs) in a cloud RAN (C-RAN) deployment. The C-RAN is also called as CU/DU split. Similarly, a RAN node 2 may be an eNB or a gNB and may include a Central Unit (CU) and one or more Distributed Units (DUs). Each RAN node may be an Evolved Universal Mobile Telecommunications System (UMTS) Terrestrial Radio Access Network (EUTRAN) node or a Next generation Radio Access Network (NG-RAN) node. The EUTRAN node may be eNB or an en-gNB. The NG-RAN node may be a gNB or an ng-eNB. The Radio Access Technology (RAT) of the RAN Node 1 may be different from that of the RAN Node 2.

The RAN node 1 serves at least one cell 11. The RAN node 2 serves a plurality of cells (e.g., four cells 21 to 24). In the example of FIG. 1, the cell 11 served by the RAN node 1 is a current serving cell of the radio terminal 3, and the radio terminal (i.e., User Equipment (UE)) 3 is handed over from the cell 11 to any of the cells served by the RAN node 2. Accordingly, in the following, the RAN node 1 is referred to as the source RAN node, and the RAN node 2 is referred to as the target RAN node. The cell 11 is referred to as the source cell. The source RAN node 1 selects one or more of the cells 21 to 24 of the target RAN node 2 as candidates for the target cell of the handover, and notifies the target RAN node 2 of them. The cell selected by the source RAN node 1 is referred to as a candidate target cell. Hereinafter, as an example, it is assumed that the cells 21 to 23 are the candidate target cells.

The handover of the radio terminal 3 may be a normal handover or a conditional handover. In the normal handover, the radio terminal 3 initiates access to the target RAN node 2 as soon as it receives an RRC message including a handover instruction from the source RAN node 1. In the normal handover, the source RAN node 1 may select one preferred target cell for the radio terminal 3 from among target cells admitted by the target RAN node 2 among the candidate target cells 21 to 23, and notify the radio terminal 3 of it. For example, the normal handover may be a handover triggered by a mobilityControlInfo IE or a reconfiguration-WithSync IE included in a RRC (Connection) Reconfiguration message. In this case, the mobilityControlInfo IE or the reconfigurationWithSync IE is a handover instruction that triggers the handover of the radio terminal 3.

On the other hand, in the conditional handover, the source RAN node 1 transmits a handover instruction including a handover execution condition (e.g., threshold) to the radio terminal 3 via an RRC message. The radio terminal 3 maintains the connection with the source RAN node 1 even after receiving the RRC message, and initiates access to the target RAN node 2 as soon as the configured condition is satisfied. In the conditional handover, the radio terminal 3 may receive from the source RAN node (e.g., eNB) a handover instruction including configurations of a plurality of candidate target cells 21 to 23 and a CHO execution condition (e.g., threshold). The handover instruction including the handover execution condition (e.g., threshold) may be referred to as a conditionalMobilityControlInfo IE. The CHO execution condition (e.g., threshold) may be common to the plurality of candidate target cells 21 to 23, or may be different for each candidate target cell. The radio terminal 3 may perform (or initiate) measurements of the indicated candidate target cells 21 to 23, and when the measurement for any candidate target cell meets a CHO execution threshold, initiate access (e.g., random access) to this candidate cell. The measurement for each candidate target cell may be only a measurement in the concerned candidate target cell if the condition of the conditional handover (e.g., CHO execution threshold) relates only to a measurement result of the candidate target cell. On the other hand, if the condition of the conditional handover relates to measurement results of both the candidate target cell and the source cell (i.e., the current primary serving cell (PCell)), the measurement for the candidate target cell may include both a measurement in the candidate target cell and a measurement in the PCell.

The handover of the radio terminal 3 in the present embodiment can also be referred to as mobility of the radio terminal 3. The handover or mobility of the radio terminal 3 may be an inter-master node (MN) handover in Dual Connectivity (DC) or a Secondary Node (SN) Change in DC.

Additionally or alternatively, the handover or mobility of the radio terminal 3 may be a Primary Cell (PCell) change of a Master Cell Group (MCG) in DC. Additionally or alternatively, the handover or mobility of radio terminal 3 may be a change of the primary cell of a Secondary Cell Group (SCG) (i.e., Primary SCG Cell (PSCell) Change) in DC. In these cases, the source RAN node 1 may be a source DU, while the target RAN node 2 may be a target DU. Alternatively, the source RAN node 1 may be a combination of a (source) CU and a source DU, while the target RAN node 2 may be a combination of a (target) CU and a target DU.

The DC may be Multi-Radio Dual Connectivity (MR-DC). The MR-DC includes Evolved Universal Mobile Telecommunications System (UMTS) Terrestrial Radio Access (E-UTRA)-NR Dual Connectivity (EN-DC), NR-E-UTRA DC (NE-DC), NG-RAN EN-DC (NGEN-DC), and NR-NR DC (NR DC).

Figure 2:
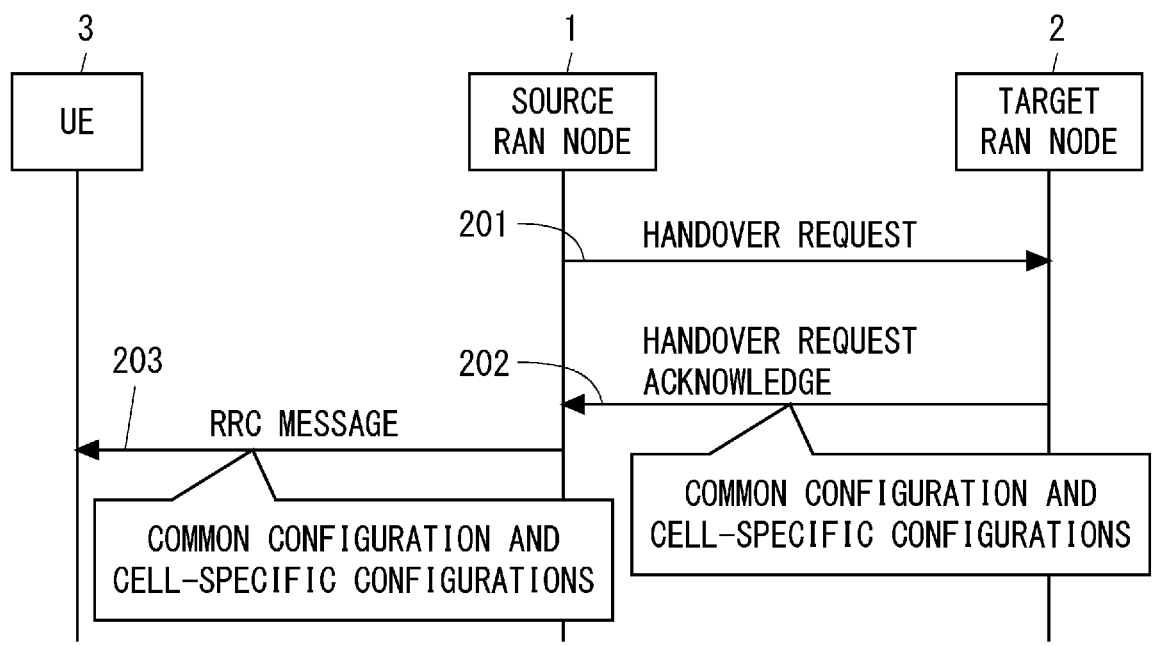
FIG. 2 is a sequence diagram showing an example of signaling according to a first embodiment.

FIG. 2 shows an example of signaling in the handover procedure for handing over the radio terminal 3 from the source cell 11 to one of the plurality of candidate target cells 21 to 23. In step 201, the source RAN node 1 decides that a handover (normal handover or conditional handover) is needed and sends a handover request message to the target RAN node 2. If a plurality of cells (e.g., cells 21 to 23) served by the target RAN node 2 are suitable for the handover, the handover request message may indicate a plurality of candidate target cells.

In steps 202 and 203, the target RAN node 2 transmits to the radio terminal 3, via the source RAN node 1, a first configuration common to the plurality of candidate target cells 21 to 23 and a plurality of second configurations each associated with a respective one of the plurality of candidate target cells 21 to 23. In other words, in step 203, the radio terminal 3 receives the first configuration common to the candidate target cells 21 to 23 and the plurality of second configurations each associated with a respective one of the target cells 21 to 23. The radio terminal 3 then perform a handover using the received common first configuration and plurality of second configurations. In the case of a conditional handover, the radio terminal 3 determines whether the condition (e.g., threshold) is satisfied for each of the candidate target cells 21 to 23, and uses the common first configuration and the second configuration regarding any one cell which has met the condition (e.g., threshold) to perform the (conditional) handover to this cell.

As shown in FIG. 2, by way of example, and not limitation, the target RAN node 2 may include the first configuration and the plurality of second configurations in a handover acknowledge message (step 202). More specifically, in some implementations, the first configuration and the plurality of second configurations may be stored in a Target To Source Transparent Container contained in the handover acknowledge message. The source RAN node 1 may put the information contained in the Target To Source Transparent Container (e.g., RRC Handover Command) into an RRC message (e.g., RRC Reconfiguration), and transmit it to the radio terminal 3 (step 203). Such an operation may be performed, for example, in the case of conditional handovers.

Alternatively, in some implementations, the source RAN node 1 may receive from the target RAN node 2 the handover acknowledge message, which carries the first configuration and the plurality of second configurations, and select one preferred target cell for the radio terminal 3 from among the plurality of candidate target cells 21 to 23. The source RAN node 1 may then derive a configuration of the selected target cell from the first configuration and the plurality of second configurations, or create (or prepare) it based on those, and transmit the configuration of the selected target cell contained in the handover command to the radio terminal 3 via an RRC message (e.g., RRC Reconfiguration) . In this case, the first configuration and the plurality of second configurations are transmitted through the inter-RAN node interface between the RAN nodes 1 and 2, but do not need to be transmitted through the air interface between the RAN node 1 and the radio terminal 3.

The first configuration (i.e., common configuration) includes at least one configuration parameter for enabling the radio terminal 3 to access one of the plurality of candidate target cells or to communicate therein. Each second configuration (i.e., cell specific configuration) includes at least one configuration parameter for enabling the radio terminal 3 to access the corresponding candidate target cell or to communicate therein. The cell specific configuration may be referred to as a dedicated configuration.

The first configuration and the plurality of second configurations may not include a handover execution condition (e.g., threshold (event) and a corresponding time-to-trigger (TTT)) for a conditional handover, or a condition (e.g., offset) for the radio terminal to exit the conditional handover, or a value of a validity timer. The value of the validity timer may indicate how long the resources of the candidate target cell are valid. Alternatively, the value of the validity timer may indicate a period (or time) during which access to the candidate target cell is accepted, or a period (or time) during which the configuration for the conditional handover (e.g., first configuration, second configuration) is valid.

The at least one configuration parameter included in the first configuration may relate to a configuration of a radio bearer. Specifically, the first configuration may include one or more radio bearer configurations (e.g., RadioBearerConfig) which are common to the plurality of candidate target cells. In this case, the target RAN node 2 may generate a radio bearer configuration for one of the plurality of candidate target cells that have approved to admit the handover (or accept the handover) and omit radio bearer configurations for the remaining candidate target cells. Alternatively, the target RAN node 2 may generate a radio bearer configuration common for the plurality of candidate target cells that have approved to admit the handover (or accept the handover) and may not generate a dedicated radio bearer configuration for each of the candidate target cells. Additionally or alternatively, the target RAN node 2 may additionally generate a radio bearer configuration only for a candidate target cell that needs a dedicated radio bearer configuration. That is, as well as a common radio bearer configuration, a radio bearer configuration specific to a candidate target cell that requires a configuration different from the common radio bearer configuration may be generated.

These one or more radio bearer configurations may include configuration information or parameters for a Packet Data Convergence Protocol (PDCP) for radio bearers, or include configuration information or parameters for a Service Data Adaptation Protocol (SDAP). The one or more radio bearer configurations may include a list (e.g., srb-ToAddModList) of signaling radio bearers (SRBs) to be added or modified. The one or more radio bearer configurations may include a list (e.g., drb-ToAddModList) of data radio bearers (DRBs) to be added or modified. The one or more radio bearer configurations may include a list (e.g., drb-ToReleaseList) of DRBs to be released. The one or more radio bearer configurations may include security configurations indicating security algorithms and keys to be used for signaling and data radio bearers.

Additionally or alternatively, the at least one configuration parameter included in the first configuration may include System Information (SI). For example, the same SI area identifier (e.g., systemInformationAreaID) may be assigned to the plurality of candidate target cells 21 to 23. In this case, the target RAN node 2 may configure system information for one of the candidate target cells that have approved to admit the handover (or accept the handover) and may omit system information for the remaining candidate target cells that have the same SI area identifier as the one cell. Alternatively, the target RAN node 2 configures system information common for the candidate target cells that have approved to admit the handover (or accept the handover) and does not need to configure dedicated system information for each of the candidate target cells. Additionally or alternatively, the target RAN node 2 may additionally configure system information only for a candidate target cell that needs dedicated system information (i.e., that has a different SI area identifier). That is, as well as common system information, system information specific to a candidate target cell that requires a configuration different from the common system information may be configured. The system information may be System Information Block Type 1 (SIB1), a combination of SIB1 and other SI, or SI other than SIB1.

Additionally or alternatively, the at least one configuration parameter included in the first configuration may include security-related information (e.g., masterKeyUpdate). For example, the same security-related information may be assigned to the plurality of candidate target cells 21 to 23. In this case, the target RAN node 2 may configure security-related information for one of the candidate target cells that have approved to admit the handover (or accept the handover) and may omit security-related information for the remaining candidate target cells to which the same security policy as that one cell is applied. Alternatively, the target RAN node 2 may configure security-related information common for the candidate target cells that have approved to admit the handover (or accept the handover) and may not configure dedicated security-related information for each of the candidate target cells. Additionally or alternatively, the target RAN node 2 may additionally configure security-related information only for a candidate target cell that needs dedicated security-related information (e.g., that needs a different security policy). That is, as well as common security-related information, security-related information that is specific to a candidate target cell and different from the common security-related information may be configured. The security-related information may include information regarding a security key (e.g., nextHopChainingCount) to be used in the target cell, or include NAS layer information.

Additionally or alternatively, the at least one configuration parameter included in the first configuration may include another configuration information (e.g., OtherConfig). For example, regarding the other configuration, the same policy (e.g., setup, release of configuration) may be applied to the plurality of candidate target cells 21 to 23. In this case, the target RAN node 2 may configure other configuration information for one of the plurality of candidate target cells that have approved to admit the handover (or accept the handover), and omit other configuration information for the remaining candidate target cells to which the same policy as the one cell is applied. Alternatively, the target RAN node 2 may configure other configuration information common for the plurality of candidate target cells that have approved to admit the handover (or accept the handover) and may not configure dedicated information for each of the candidate target cells. Additionally or alternatively, the target RAN node 2 may additionally configure other configuration information only for a candidate target cell that needs dedicated other configuration information (e.g., that has a different policy regarding the other configurations). That is, as well as common other configuration information, other configuration information that is specific to a candidate target cell and different from the common one may be configured. The other configuration information (e.g., OtherConfig) may include, for example, information regarding data transmission delay (e.g., delayBudgetReportingConfig), information regarding In-Device Coexistence (IDC) (e.g., idc-Config), information regarding transmission power preferences by radio terminals (e.g., powerPrefIndicationConfig), information regarding detailed location information using GNSS etc. (e.g., obtainLocationConfig), information regarding bandwidth preferences by radio terminals (e.g., bw-PreferenceIndicationTimer), information regarding overheating in radio terminals (e.g., overheatingAssistanceConfig), and information regarding Multimedia Broadcast and Multicast Service (MBMS) (e.g., MBMS interest indication).

On the other hand, the at least one configuration parameter included in each second configuration may be related to configurations of at least one of a cell group, a medium access control (MAC) entity, a logical channel set, or random access.

Configuration parameters (e.g., CellGroupConfig) regarding a cell group may include configuration parameters for a master cell group (MCG), or a secondary cell group (SCG), or both. A cell group includes a MAC entity, a set of logical channels, and a plurality of associated Radio Link Control (RLC) entities. In addition, the cell group includes a primary cell (i.e., Special Cell (SpCell)) and one or more secondary cells (SCells). The SpCell is a Primary Cell of the MCG or a Primary SCG Cell (PSCell) of the SCG. The configurations or parameters for the SpCell included in a CellGroupConfig are referred to as an SpCellConfig.

Configuration parameters (e.g., mac-CellGroupConfig) regarding a MAC entity may include MAC parameters that are applicable to the entire cell group.

Configuration parameters (e.g., rlc-BearerToAddModList) regarding a set of logical channels may include configurations of MAC Logical Channels and corresponding RLC entities.

Configuration parameters regarding random access may indicate resources for a dedicated random access preamble.

The handover execution condition, the condition for the radio terminal 3 to exit the conditional handover, and the value of the validity timer may be configured by the source RAN node 1 or by the target RAN node 2. For example, the source RAN node 1 may configure and transmit them (i.e. the handover execution condition, the condition for the radio terminal 3 to exit the conditional handover, and the value of the validity timer) to the radio terminal 3. In this case, for example, the source RAN node 1 may send to the target RAN node 2 a handover request message containing these conditions and value configured by the source RAN node 1, and the target RAN node 2 may include them in a handover command. Alternatively, the source RAN node 1 may include these conditions and value configured by the source RAN node 1, in addition to and separately from the RRC message or IE received from the target RAN node, in an RRC message including an hand over instruction, to transmit them to the radio terminal 3. Alternatively, the target RAN node 2 may configure and send them (i.e. the handover execution condition, the condition for the radio terminal 3 to exit the conditional handover, and the value of the validity timer) to the source RAN node 1 with, for example, a handover command, and the source RAN node 1 may transmit it to the radio terminal 3. For example, the source RAN node 1 may forward the handover command (e.g., conditionalMobilityControlInfo IE) received from the target RAN node 2 as it is. Furthermore, each of the handover execution condition, the condition for the radio terminal 3 to exit the conditional handover, and the value of the validity timer may be configured by any of the above-described methods and transmitted to the radio terminal 3. For example, the handover execution condition, the condition for the radio terminal 3 to exit the conditional handover, and the value of the validity timer may be included in the handover command (e.g., conditionalMobilityControlInfo IE).

The first configuration does not necessarily have to be common to all the candidate target cells 21 to 23. For example, the target RAN node 2 may configure a first configuration common to the cells 21 and 22 and also configure a first configuration (or similar information) applied to the cell 23, and then send them to the source RAN node 1. In this case, the target RAN node 2 may send them to the source RAN node 1 as two first configurations, or as one first configuration and additional information corresponding to the one first configuration. More specifically, the target RAN node 2 may explicitly indicate to the source RAN node 1 that the two first configurations are the first configuration common to the cells 21 and 22 and the first configuration applied to the cell 23. Alternatively, the target RAN node 2 may send, to the source RAN node 1, information indicating that the first configuration is to be applied to the cells 21 and 22 (or is not applied to the cell 23), as well as configuration information (or configuration parameters) for the cell 23 which includes additional information corresponding to the first configuration to be applied to the cell 23.

As can be understood from the above description, in the present embodiment, during a handover procedure for handing over the radio terminal 3 from the source cell 11 to one of the candidate target cells 21 to 23, the target RAN node 2 transmits to the radio terminal 3, via the source RAN node 1, the first configuration common to these candidate target cells and the plurality of second configurations each associated with a respective one of these candidate target cells. The first configuration common to the plurality of candidate target cells can reduce the data size of the configurations regarding the plurality of candidate target cells. This can reduce the signaling overhead of the inter-RAN node interface (and the air interface) in the handover procedure.

Second Embodiment

The present embodiment provides improvement of handover-related messages transmitted on an inter-RAN node interface, to adapt to a conditional handover. A configuration example of a radio communication network according to the present embodiment may be similar to that shown in FIG. 1. In addition, in the present embodiment, a plurality of candidate target cells may be served by a plurality of RAN nodes 2.

In some implementations, a new HANDOVER REQUEST message (e.g., CONDITIONAL HANDOVER REQUEST message) may be defined for a conditional handover. The new HANDOVER REQUEST message may include a list of candidate target cells (e.g., target cell list), and also include information elements (e.g., UE Context information) required at least for target cell setting for CHO among the information elements included in the existing HANDOVER REQUEST message. If the source RAN node 1 detects that the radio terminal 3 has executed the conditional handover, it may send to one or more target RAN nodes 2 an additional message that contains the remaining information elements included in the existing HANDOVER REQUEST message. If the source RAN node 1 can identify the target cell to which the radio terminal 3 moves, it may send the additional message only to the target RAN node that serves the identified target cell. The source RAN node 1 may detect a handover execution by receiving a CHO indication (e.g., measurement report, or CHO triggered indication) from the radio terminal 3. The CHO indication from the radio terminal 3 may include information (e.g., Cell Global ID, PCI, target cell index) indicating the target cell to which the handover is directed. Instead, the source RAN node 1 may autonomously determine the handover execution condition for CHO, thereby autonomously detecting the handover execution.

Alternatively, in some implementations, the existing HANDOVER REQUEST message may be enhanced (or improved) for a conditional handover. The format of an improved HANDOVER REQUEST message may be defined, for example, but not limited to, as shown in FIG. 3. In the example of FIG. 3, the improved HANDOVER REQUEST message includes a candidate target cell list information element (IE) in addition to the existing target cell ID information element (IE) (e.g., Target Cell Global ID IE). The target cell ID IE (e.g., Target Cell Global ID IE) may indicate one of the plurality of candidate target cells. Specifically, the target cell ID IE (e.g., Target Cell Global ID IE) may indicate the cell with the highest priority (i.e., the cell most preferable for the radio terminal 3 to move to). On the other hand, the candidate target cell list IE may indicate the rest of the plurality of candidate target cells.

The new HANDOVER REQUEST message for a conditional handover or the enhanced (or improved) HANDOVER REQUEST message for a conditional handover may include a new Radio Resource Control (RRC) information element (IE). This IE may include a handover execution condition (e.g., threshold and TTT) of associated with each candidate target cell. Additionally or alternatively, the message may include either or both of a condition (e.g., offset) for the radio terminal to exit the conditional handover and a value of a validity timer.

Furthermore, in some implementations, a new HANDOVER REQUEST ACKNOWLEDGE messages (e.g., CONDITIONAL HANDOVER REQUEST ACKNOWLEDGE messages) may be defined for a conditional handover. The new HANDOVER REQUEST ACKNOWLEDGE message may include a list of candidate target cells (e.g., target cell admitted list) that have approved (or accepted) the conditional handover, and also include information elements (e.g., Target NG-RAN node To Source NG-RAN node Transparent Container) required at least for target cell setting for CHO among the information elements included in the existing HANDOVER REQUEST ACKNOWLEDGE message.

The new HANDOVER REQUEST ACKNOWLEDGE message may include a new RRC information element (IE). This IE may include a handover execution condition (e.g., threshold and TTT) associated with each candidate target cell. Additionally or alternatively, this IE may include either or both of a condition (e.g., offset) for the radio terminal to exit the conditional handover and a value of a validity timer.

Alternatively, in some implementations, the existing HANDOVER REQUEST ACKNOWLEDGE message may be enhanced (or improved) for a conditional handover. The format of the improved HANDOVER REQUEST ACKNOWLEDGE message may be defined, for example, but not limited to, as shown in FIG. 4. In the example of FIG. 4, the improved HANDOVER REQUEST ACKNOWLEDGE message includes a list (e.g., target cell admitted list information elements) of candidate target cells that have approved (or accepted) the conditional handover.

The message formats shown in FIGS. 3 and 4 are just examples. For example, the Candidate Target Cell List IE in FIG. 3 may be referred to as an Additional Target Cell List IE or an Other Target Cell List IE.

Third Embodiment

The present embodiment provides improvement of handover-related messages transmitted on an inter-RAN node interface, to adapt to a conditional handover. A configuration example of a radio communication network according to the present embodiment may be similar to that shown in FIG. 1. However, in the present embodiment, a C-RAN deployment is applied to a target RAN node 2 (e.g., gNB). The target RAN node 2 includes a CU 25 (e.g., gNB-CU) and one or more DUs 26 (e.g., gNB-DU).

In some implementations, a source RAN node 1 transmits a handover instruction including a handover execution condition (e.g., threshold) to the radio terminal 3 via an RRC message. The radio terminal 3 maintains the connection with the source RAN node 1 even after receiving the RRC message, and initiates access to the target RAN node 2 as soon as the configured condition is satisfied. In the conditional handover, the radio terminal 3 may receive from the source RAN node (e.g., gNB) a handover instruction including configurations of a plurality of candidate target cells 21 to 23 and a CHO execution threshold. The radio terminal 3 may performs (or initiate) measurements of the indicated candidate target cells 21 to 23, and when the measurement in any candidate target cell meets the CHO execution threshold, initiate access (e.g., random access) to this candidate cell. In other words, the radio terminal 3 initiates access to the DU 26 (e.g., gNB-DU) of the target RAN node 2 that manages the candidate cell, and establishes an RRC connection with the CU 25 (e.g., gNB-CU) of the target RAN node 2.

Figure 5:
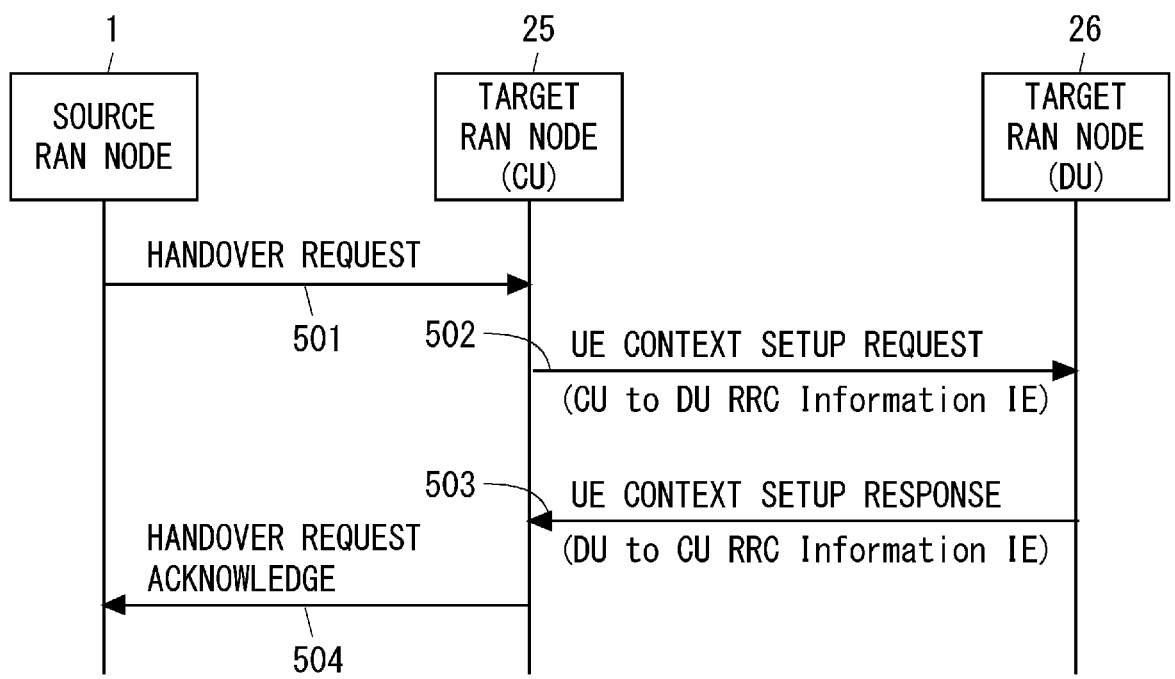
FIG. 5 is a sequence diagram showing an example of signaling according to a third embodiment.

FIG. 5 shows an example of signaling in the handover procedure for handing over the radio terminal 3 from a source cell 11 to one of the plurality of candidate target cells 21 to 23. In step 501, the source RAN node 1 decides that a handover (i.e., a normal handover or a conditional handover) is required and sends a handover request message (HANDOVER REQUEST) to the CU 25 of the target RAN node 2. If a plurality of cells (e.g., cells 21 to 23) served by (one or more DUs 26 of) the target RAN node 2 are suitable for the handover, the handover request message may indicate a plurality of candidate target cells.

In step 502, the CU 25 of the target RAN node 2 sends to the DU 26 a request message (UE CONTEXT SETUP REQUEST) for establishing a context of the radio terminal 3. The CU 25 may transmit this request message to each of a plurality of DUs 26 that serve a plurality of candidate target cells. The request message for establishing the context includes part of the information (e.g., Handover Preparation Information) contained in the handover request message received from the source RAN node 1. The request message for establishing the context may indicate a plurality of candidate target cells for a conditional handover. The information of the plurality of candidate target cells may be included in an IE (e.g., CU To DU RRC Information) containing RRC information. More specifically, the information of the plurality of candidate target cells may be included, for example, in Handover Preparation Information contained in this IE.

In step 503, the DU 26 of the target RAN node 2 sends a response message (UE CONTEXT SETUP RESPONSE) to the CU 25. This response message includes a plurality of second configurations each associated with a respective one of the plurality of candidate target cells 21 to 23. The DU 26 of the target RAN node 2 may include a second configuration for each candidate target cell that is able to admit (or has admitted) the handover in the response message, while not including a second configuration for a candidate target cell that is unable to admit (or refused) the handover in the response message. The plurality of second configurations may be included in an IE (e.g., DU To CU RRC Information)

containing RRC information. More specifically, the plurality of second configurations may be included, for example, in a CellGroupConfig IE contained in this IE.

In step 504, the CU 25 of the target RAN node 2 sends a first configuration common to the plurality of candidate target cells 21 to 23 and the plurality of second configurations received from one or more DUs 26, to the source RAN node 1 via a handover acknowledge message (HANDOVER REQUEST ACKNOWLEDGE). The CU 25 of the target RAN node 2 may associate the first configuration only with candidate target cells to which one or more DUs 26 are able to admit (or have admitted) the handover. In other words, the CU 25 of the target RAN node 2 may associate the first configuration only with candidate target cells of which the CU 25 have received from one or more DUs 26 the second configuration. Although not illustrated, the source RAN node 1 transmits a handover instruction including both the first configuration and the plurality of second configurations to the radio terminal 3 via an RRC message (e.g., RRC Reconfiguration).

In some implementations, a new HANDOVER REQUEST message (e.g., CONDITIONAL HANDOVER REQUEST message) may be defined for a conditional handover. Similarly, an inter-RAN node RRC message (Handover Preparation Information) contained in the handover request message may be newly defined for a conditional handover (e.g., Conditional Handover Preparation Information). Furthermore, a new HANDOVER REQUEST ACKNOWLEDGE message (e.g., CONDITIONAL HANDOVER REQUEST ACKNOWLEDGE message) may be defined for a conditional handover.

In some implementations, the C-RAN deployment may also be applied to the source RAN node 1. In this case, the CU (e.g., gNB-CU) of the source RAN node 1 may transmit a handover instruction to the radio terminal 3 via a DU (e.g., gNB-DU) of the source RAN node 1, based on or in response to receiving from the CU of the target RAN node 2 an acknowledge message (e.g., HANDOVER REQUEST ACKNOWLEDGE) to a request of conditional handover (e.g., HANDOVER REQUEST). In this case, the CU of the source RAN node 1 may send, to the DU of the source RAN node 1, information which explicitly or implicitly indicates that a conditional handover instruction is to be transmitted, or has been transmitted.

Fourth Embodiment

The present embodiment provides improvement of handover-related messages transmitted on the inter-RAN node interface, to adapt to a conditional handover. A configuration example of a radio communication network according to the present embodiment may be similar to that shown in FIG. 1. In addition, in the present embodiment, a plurality of candidate target cells may be served by a plurality of RAN nodes 2.

Figure 6:
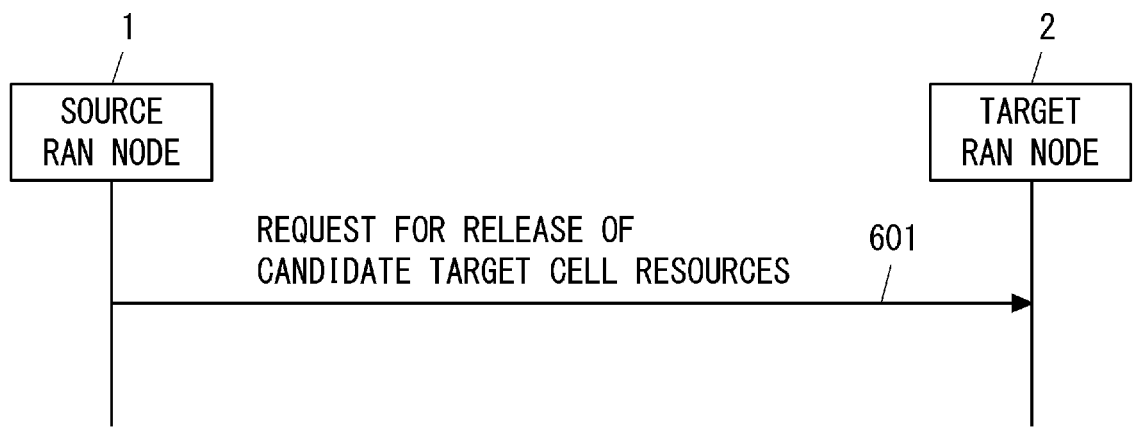
FIG. 6 is a sequence diagram showing an example of signaling according to a fourth embodiment.

FIG. 6 is a diagram showing an example of signaling according to the present embodiment. In step 601, a source RAN node 1 sends a request for release of the resources of a candidate target cell to one or more target RAN nodes 2. The request requests each target RAN node 2 to release the resources of one or more candidate target cells reserved for a conditional handover. The source RAN node 1 may send the request to target RAN nodes 2 that manage candidate target cells different from the target cell to which the radio terminal 3 is moving. The request may be sent by a UE context release message (e.g., HANDOVER CANCEL, or UE CONTEXT REMOVAL) from the source RAN node 1 to the target RAN node 2. In this case, a release Cause value attached to (or included in) the UE context release message may be, for example, "Handover Condition Met", "Action Desirable for Radio Reasons", "Handover Complete", "Normal Release", or "Candidate Target Cell Found".

For example, the source RAN node 1 may send the request of step 601 if it detects that the radio terminal 3 has completed the conditional handover. The source RAN node 1 may detect this by receiving a message (e.g., UE CONTEXT RELEASE message) indicating a success of the handover of the radio terminal 3 from any of the target RAN nodes 2. In this case, a release Cause value attached to (or included in) the UE CONTEXT RELEASE message may be, for example, "Handover Condition Met", "Action Desirable for Radio Reasons", "Handover Complete", "Normal Release", or "Candidate Target Cell Found".

Alternatively, the source RAN node 1 may send the request of step 601 if it detects that the radio terminal 3 has executed (or initiated) the conditional handover. The source RAN node 1 may detect the handover execution by receiving a CHO indication (e.g., measurement report, or CHO triggered indication) from the radio terminal 3. The source RAN node 1 may autonomously determine a handover execution condition for CHO, thereby autonomously detecting a handover execution.

According to such an operation, for example, it is possible to allow the target RAN node 2 to release the resources reserved for CHO in response to a request from the source RAN node 1 without waiting for expiration of a validity timer.

The request of step 601 may be sent on a per-candidate target cell, per-radio terminal, or per-target RAN node basis.

The request of step 601 may include identifiers (e.g., target indices) for respective candidate target cells to identify one or more candidate cells of which the resources may be released. Alternatively, the request of step 601 may include cell IDs of respective candidate cells (e.g., Physical Cell Identities (PCIs), Cell Global Identities (CGIs), or Cell Identities (CIs)).

Alternatively, the request of step 601 may include an identifier of the conditional handover to identify one or more candidate cells of which the resources may be released. The identifier of the conditional handover may also be included in the handover request message sent from the source RAN node 1 to the target RAN node 2 to request the conditional handover. This enables the identifier of the conditional handover to be associated with one or more candidate target cells.

Meanwhile, if the radio terminal 3 has completed a conditional handover to any of the candidate target cells, it may autonomously release the resources (i.e., radio resource configurations) of the other candidate target cells. Alternatively, the radio terminal 3 may release the resources of the other candidate target cells in response to receiving a release request from the network (e.g., target RAN node 2) after completion of the conditional handover.

Fifth Embodiment

The present embodiment provides specific examples of signaling for a conditional handover. A configuration example of a radio communication network according to the present embodiment may be similar to that shown in FIG. 1. However, in the present embodiment, the C-RAN deployment is applied to at least a target RAN node 2 (e.g., gNB). The target RAN node 2 includes a CU 25 (e.g., gNB-CU) and one or more DUs 26 (e.g., gNB-DU). A plurality of candidate target cells may be served by one DU 26 or may be served by a plurality of DUs 26.

Figure 7:
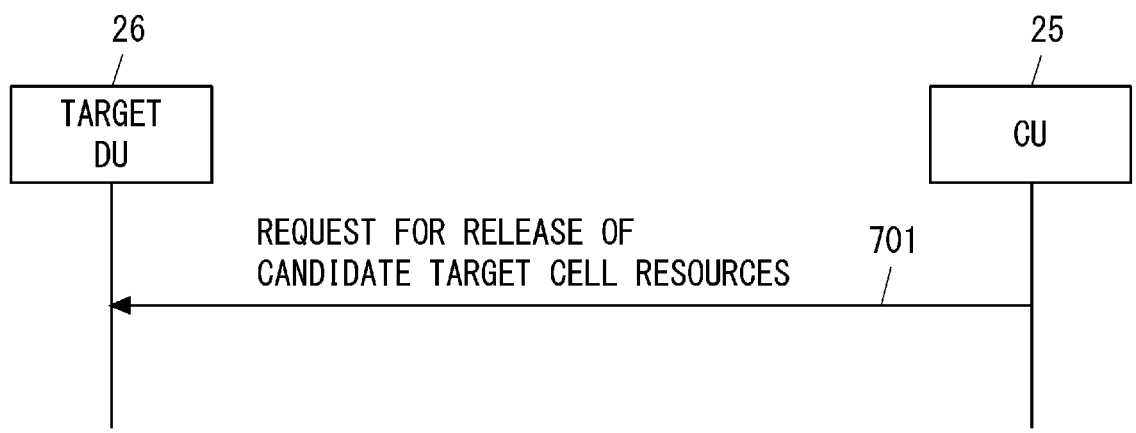
FIG. 7 is a sequence diagram showing an example of signaling according to a fifth embodiment.

FIG. 7 is a diagram showing an example of signaling related to a conditional handover. In step 701, the CU 25 of the target RAN node 2 sends to one or more target DUs 26 a request for release of the resources of candidate target cells. The request requests each target DU 26 to release the resources of one or more candidate target cells reserved for the conditional handover. The CU 25 may send the request to target DUs 26 which manage candidate target cells different from the target cell to which the radio terminal 3 is moving.

The message to be transmitted in step 701 to request releasing resources may be, for example, a UE CONTEXT RELEASE COMMAND message. In this case, a release Cause value attached to (or included in) the UE CONTEXT RELEASE COMMAND message may be, for example, "Handover Condition Met", "Action Desirable for Radio Reasons", "Handover Complete", or "Normal Release".

For example, the CU 25 of the target RAN node 2 may send the request of step 701 to the DU(s) 26, in response to receiving from a source RAN node 1 a request for release of the resources of candidate target cells (e.g., step 601 of FIG. 6).

According to such an operation, for example, it is possible to allow the target DU 26 to release the resources reserved for conditional mobility in response to a request from the CU 25 without waiting for expiration of a validity timer.

Meanwhile, if the radio terminal 3 has completed a conditional handover to any of the candidate target cells, it may autonomously release the resources (i.e., radio resource configurations) of the other candidate target cells. Alternatively, the radio terminal 3 may release the resources of the other candidate target cells in response to receiving a release request from the network (e.g., target RAN node 2 or CU 25) after completion of the conditional handover.

The procedure shown in FIG. 7 may be applied to an intra-CU inter-DU conditional handover. In the case of the intra-CU inter-DU conditional handover, one of the plurality of DUs 26 connected to the CU 25 is the source DU that serves the source cell 11, and another one or more DUs 26 are the target DUs that serve one or more candidate target cells. The CU 25 acts as the source RAN node 1 and the target RAN node 2.

In the case of the intra-CU inter-DU conditional handover, for example, the CU 25 may send the request of step 701 if it detects that the radio terminal 3 has completed the conditional handover. The CU 25 may detect the completion of the conditional mobility by receiving from any target DU 2 a message (e.g., UPLINK RRC TRANSFER message that carries an RRCReconfigurationComplete message) indicating success of the conditional handover of the radio terminal 3. When the CU 25 and the DUs 26 are a Secondary Node (SN) of Dual Connectivity (DC), the CU 25 may detect the completion of the conditional mobility by receiving a message (e.g., an RRC Reconfiguration Complete message) indicating success of the conditional handover of the radio terminal 3 from the radio terminal 3 via a Master Node (MN).

Alternatively, the CU 25 may send the request of step 701 if it detects that the radio terminal 3 has executed (or initiated) the conditional handover. The CU 25 may detect the handover execution (or initiation) by receiving an indication of initiation of the conditional handover (e.g., measurement report) from the radio terminal 3 or any of the target DUs 26.

Sixth Embodiment

The present embodiment provides specific examples in the conditional mobility other than the conditional handover (CHO). The conditional mobility in this embodiment may be a Primary Cell (PCell) change of a Master Cell Group (MCG) in Dual Connectivity (DC), or an inter-Master Node (MN) handover in DC. Additionally or alternatively, the conditional mobility may be a Secondary Node (SN) Change in DC, or a change of a primary cell (i.e., Primary SCG Cell (PSCell) Change) of a Secondary Cell Group (SCG) in DC. The PCell change of the MCG in DC can be executed in a procedure similar to those of the conditional handovers in the above-described embodiments.

In some implementations, a conditional mobility may be executed in the secondary node change (SN Change) in DC. For example, the source RAN node (i.e. source SN) or the MN sends a request message (e.g., SN ADDITION REQUEST) of a conditional SN Change to the target SN. In this case, the request message of the conditional SN change may indicate a plurality of candidate target cells. The target RAN node (e.g., target SN) transmits to a radio terminal (UE), via the MN, a first configuration common to the plurality of candidate target cells (e.g., PSCell candidate cells of the target SN) and a plurality of second configurations each associated with a respective one of the plurality of candidate target cells. In other words, the radio terminal receives in an MCG cell an RRC message (e.g., LTE RRC Connection Reconfiguration) of MN RAT containing an RRC message (e.g., NR RRC Reconfiguration) of SN RAT that includes the common first configuration and the plurality of second configurations. The radio terminal then performs the conditional SN Change by using the received common first configuration and the received second configurations.

In some implementations, a conditional mobility may be executed in the primary cell change (i.e., PSCell Change) of the secondary cell group (SCG) in DC. The conditional PSCell Change may also be referred to as a conditional Reconfiguration with sync (for PSCell change). For example, the source RAN node (i.e. SN) transmits to a radio terminal (UE) an RRC message of SN RAT that includes a first configuration common to a plurality of candidate target cells (i.e. PSCell candidate cells) and a plurality of second configurations each associated with a respective one of the plurality of candidate target cells. The radio terminal then performs the conditional PSCell Change by using the received common first configuration and the received second configurations. The RRC message of SN RAT may be transmitted via a signaling radio bearer (e.g., SRB1) of the MCG served by the master node (MN), or may be sent directly to the UE from the SN by an SRB (e.g., SRB3) of the SCG. In the case of the conditional PSCell Change, it may be considered that the source RAN node is the same as the target RAN node.

In some implementations, the C-RAN deployment may be applied to the target RAN node (i.e., target SN) of the conditional SN Change or the conditional PSCell Change. The target RAN node (e.g., target SgNB) includes a CU (e.g., gNB-CU) and one or more DUs (e.g., gNB-DU). In this case, the CU may decide the first configuration common to the plurality of candidate target cells, while the one or more DUs may decide the plurality of second configurations each associated with a respective one of the plurality of candidate target cells.

Specifically, the DU may include the plurality of second configurations in an RRC-Container (e.g., DU To CU RRC Information) contained in a response message (UE CONTEXT SETUP RESPONSE) to be sent in response to a request message for establishing a context of the radio terminal (UE CONTEXT SETUP REQUEST) from the CU. More specifically, the DU may include the plurality of second configurations in an RRC CellGroupConfig IE. The CU may then transmit to the radio terminal an RRC message (e.g., RRC Reconfiguration for SN Change or PSCell Change) including the first configuration and second configurations.

The plurality of candidate target cells may be served by one DU or may be served by a plurality of DUs.

The conditional PSCell Change may be an Inter-gNB-DU PSCell Change using MCG SRB. In other words, RRC signaling between the radio terminal and the CU (i.e., secondary node (SN)) for the inter-DU PSCell change may be performed via a signaling radio bearer (e.g., SRB1) of the MCG served by the master node (MN). Alternatively, the conditional PSCell change may be an Inter-gNB-DU PSCell Change using SCG SRB. In other words, RRC signaling between the UE and the CU (i.e., secondary node (SN)) for the inter-DU PSCell change may be performed via an SRB (e.g., SRB3) of the SCG. When the conditional PSCell Change is an Intra-gNB-CU Inter-gNB-DU PSCell Change, it may be considered that the CU of the source RAN node is the same as the CU of the target RAN node, while the DU of the source RAN node is different form the DU of the target RAN node.

Figure 8:
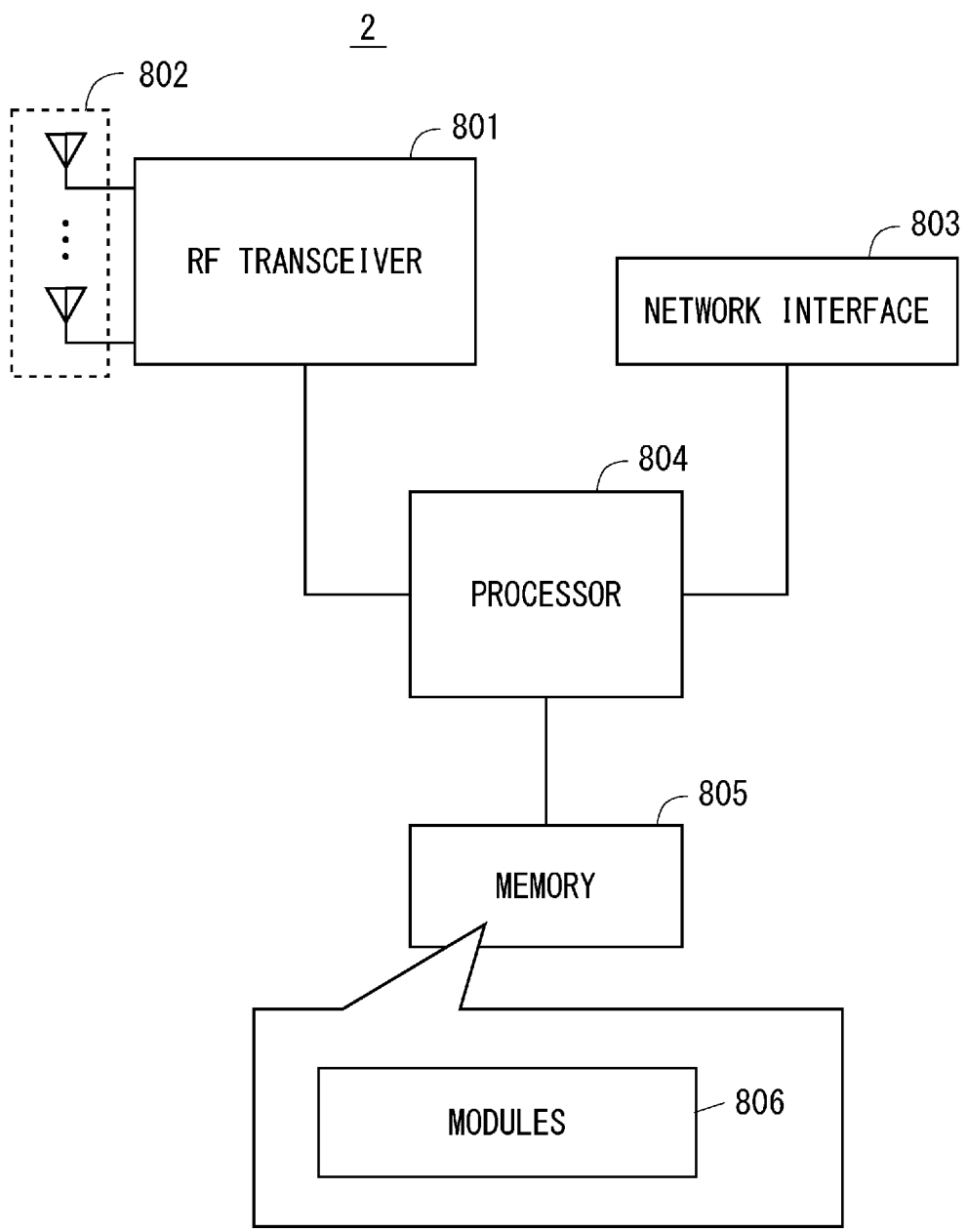
FIG. 8 is a block diagram showing a configuration example of a radio access network node according to embodiments.

The following provides configuration examples of the RAN node 1, the RAN node 2, and the UE 3 according to the above-described embodiments. FIG. 8 is a block diagram showing a configuration example of the RAN node 2 according to the above-described embodiments. The configuration of the RAN node 1 may be similar to that shown in FIG. 8. Referring to FIG. 8, the RAN node 2 includes a Radio Frequency transceiver 801, a network interface 803, a processor 804, and a memory 805. The RF transceiver 801 performs analog RF signal processing to communicate with the radio terminal 3. The RF transceiver 801 may include a plurality of transceivers. The RF transceiver 801 is coupled to an antenna array 802 and the processor 804. The RF transceiver 801 receives modulated symbol data from the processor 804, generates a transmission RF signal, and supplies the transmission RF signal to the antenna array 802. The RF transceiver 801 also generates a baseband received signal based on a received RF signal received by the antenna array 802 and supplies the baseband received signal to the processor 804. The RF transceiver 801 may include an analog beamformer circuit for beam forming. The analog beamformer circuit includes, for example, a plurality of phase shifters and a plurality of power amplifiers.

The network interface 803 is used to communicate with network nodes (e.g., the MN1, and control nodes and transfer nodes of a core network). The network interface 803 may include, for example, a network interface card (NIC) conforming to the IEEE 802.3 series.

The processor 804 performs digital baseband signal processing (i.e., data-plane processing) and control-plane processing for radio communication. The processor 804 may include a plurality of processors. The processor 804 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 804 may include a digital beamformer module for beam forming. The digital beamformer module may include a Multiple Input Multiple Output (MIMO) encoder and a pre-coder.

The memory 805 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 805 may include a storage located apart from the processor 804. In this case, the processor 804 may access the memory 805 via the network interface 803 or an I/O interface (not shown).

The memory 805 may store one or more software modules (computer programs) 806 including instructions and data to perform processing by the RAN node 2 described in the above embodiments. In some implementations, the processor 804 may be configured to load the software modules 806 from the memory 805 and execute the loaded software modules, thereby performing processing of the RAN node 2 described in the above embodiments.

When the RAN node 2 is a CU (e.g., eNB-CU or gNB-CU), the RAN node 2 does not need to include the RF transceiver 801 (and the antenna array 802).

Figure 9:
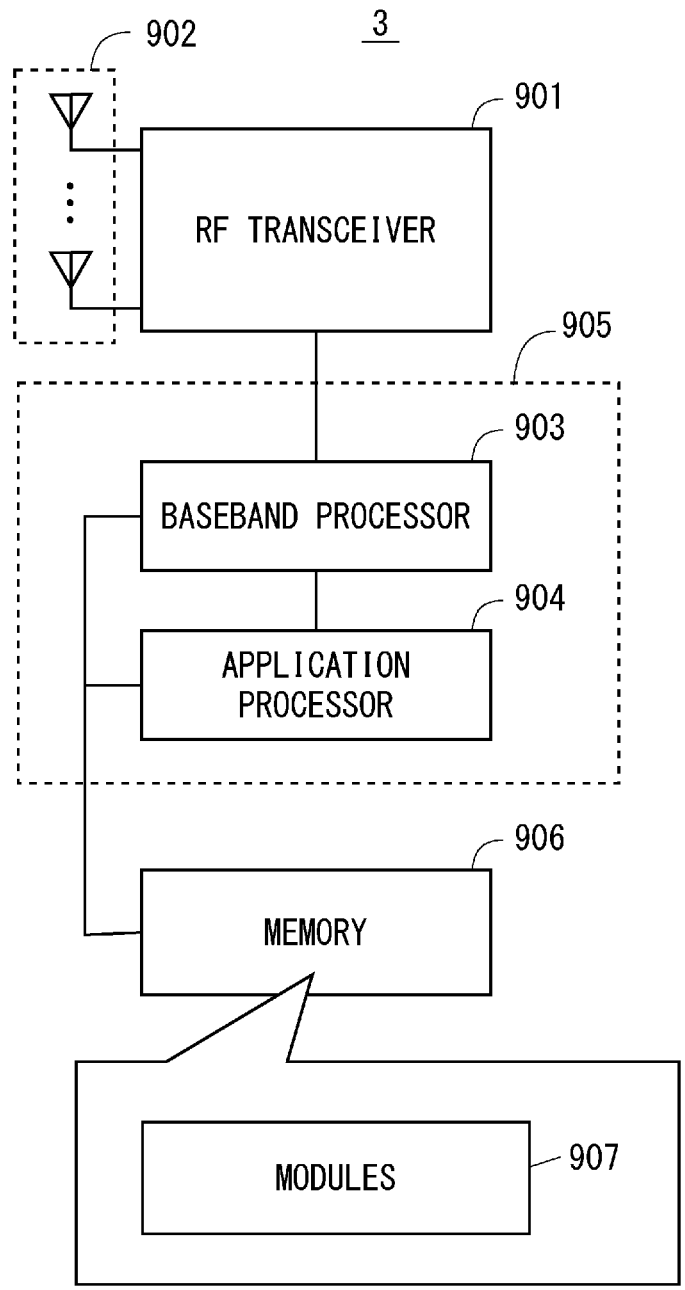
FIG. 9 is a block diagram showing a configuration example of a radio terminal according to embodiments.

FIG. 9 is a block diagram showing a configuration example of the radio terminal 3. A Radio Frequency (RF) transceiver 901 performs analog RF signal processing to communicate with the RAN nodes 1 and 2. The RF transceiver 901 may include a plurality of transceivers. The analog RF signal processing performed by the RF transceiver 901 includes frequency up-conversion, frequency down-conversion, and amplification. The RF transceiver 901 is coupled to an antenna array 902 and a baseband processor 903. The RF transceiver 901 receives modulated symbol data (or OFDM symbol data) from the baseband processor 903, generates a transmission RF signal, and supplies the transmission RF signal to the antenna array 902. The RF transceiver 901 also generates a baseband received signal based on a received RF signal received by the antenna array 902 and supplies the baseband received signal to the baseband processor 903. The RF transceiver 901 may include an analog beamformer circuit for beam forming. The analog beamformer circuit includes, for example, a plurality of phase shifters and a plurality of power amplifiers.

The baseband processor 903 performs digital baseband signal processing (i.e., data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 903 may include, for example, signal processing of a Service Data Adaptation Protocol (SDAP) layer, a Packet Data Convergence Protocol (PDCP) layer, a Radio Link Control (RLC) layer, a MAC layer, and a PHY layer.

The control-plane processing performed by the baseband processor 903 may also include processing of a Non-Access Stratum (NAS) protocol, an RRC protocol, and MAC CEs.

The baseband processor 903 may perform MIMO encoding and pre-coding for beam forming.

The baseband processor 903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 904 described in the following.

The application processor 904 is also referred to as a CPU, an MPU, a microprocessor, or a processor core. The application processor 904 may include a plurality of processors (processor cores). The application processor 904 loads a system software program (Operating System (OS)) and various application programs (e.g., a call application, a WEB browser, a mailer, a camera operation application, and a music player application) from a memory 906 or from another memory (not shown) and executes these programs, thereby providing various functions of the radio terminal 3.

In some implementations, as represented by a dashed line (905) in FIG. 9, the baseband processor 903 and the application processor 904 may be integrated on a single chip. In other words, the baseband processor 903 and the application processor 904 may be implemented in a single System on Chip (SoC) device 905. An SoC device may be referred to as a Large Scale Integration (LSI) or a chipset.

The memory 906 is a volatile memory, a non-volatile memory, or a combination thereof. The memory 906 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 906 may include, for example, an external memory device that can be accessed from the baseband processor 903, the application processor 904, and the SoC 905. The memory 906 may include an internal memory device that is integrated in the baseband processor 903, the application processor 904, or the SoC 905. The memory 906 may also include a memory in a Universal Integrated Circuit Card (UICC).

The memory 906 may store one or more software modules (computer programs) 907 including instructions and data to perform the processing by the radio terminal 3 described in the above embodiments. In some implementations, the baseband processor 903 or the application processor 904 may load these software modules 907 from the memory 906 and execute the loaded software modules, thereby performing the processing of the radio terminal 3 described in the above embodiments with reference to the drawings.

The control-plane processing and operations performed by the radio terminal 3 described in the above embodiments can be achieved by elements other than the RF transceiver 901 and the antenna array 902, i.e., achieved by the memory 906, which stores the software module 907, and one or both of the baseband processor 903 and the application processor 904.

As described above with reference to FIGS. 8 and 9, each of the processors that the RAN node 1, the RAN node 2, and the UE 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Embodiments

In the conditional handovers in the above-described embodiments, the radio terminal 3 may handle a timer T30$x$ related to the conditional handovers as follows. In a normal handover, the radio terminal 3 starts a timer T304 when receiving an RRC message instructing a handover (e.g., RRC Reconfiguration including reconfigurationWithSync). Instead, in a conditional handover, the radio terminal 3 does not have to start the timer T30$x$ immediately even if it receives an RRC message instructing a handover (e.g., RRC Reconfiguration including reconfigurationWithSync for CHO). When the condition of the conditional handover for a certain candidate target cell is satisfied, the radio terminal 3 starts the timer T30$x$ corresponding to the candidate target cell. The radio terminal 3 stops the timer T30$x$ if random access in the candidate target cell (e.g., SpCell) succeeds. The existing T304 may be used as the T30$x$, or a new timer may be specified as the T30$x$.

The above-described handover execution condition (e.g., threshold (event) and corresponding time-to-trigger (TTT)) for a conditional handover may be added (or defined) as new events for respective measurement report triggering events (e.g., Event A1, A2, A3, A4, A5, A6, B1, B2, C1, C2, W1, W2, W3, V1, V2, H1, or H2) that have already specified by the 3GPP.

Additionally or alternatively, the above-described handover execution condition for a conditional handover may include a parameter that can be replaced with at least one of the parameters contained in each measurement report triggering event that has already specified by the 3GPP.

Additionally or alternatively, the above-described handover execution condition for a conditional handover may include an offset value for at least one of the plurality of parameters included in each measurement report triggering event that has already specified by the 3GPP.

The parameters included in measurement report triggering events (e.g., Event A1, A2, A3, A4, A5, A6, B1, B2, C1, C2, W1, W2, W3, V1, V2, H1, and H2) that have already specified in the 3GPP may include, for example, but not limited to, at least one of the following:

Ms: the measurement result of the serving cell, not taking into account any offsets; the measurement result of channel busy ratio of a transmission resource pool, not taking into account any offsets; or the Aerial UE height when the radio terminal 3 is Aerial UE, not taking into account any offsets, Hys: the hysteresis value for this event, Thresh (1 or 2): the threshold value for this event,
Mn: the measurement result of the neighbour cell, not taking into account any offsets,
Ofn: the offset value specific to the frequency of the neighbour cell,
Ocn: the cell specific offset of the neighbour cell,
Mp: the measurement result of the Primary Cell or the Primary SCG Cell, not taking into account any offsets,
Ofp: the offset value specific to the frequency of the Primary Cell or the Primary SCG Cell,
Ocp: the cell specific offset of the Primary Cell or the Primary SCG Cell,
Off: the offset parameter for this event,
Mcr: the measurement result of the CSI-RS (Channel State Information-Reference Signal) resource, not taking into account any offsets,
Ocr: the CSI-RS specific offset value for the CSI-RS,
Mref: the measurement result of the reference CSI-RS resource, and
Oref: the CSI-RS specific offset value for the reference CSI-RS resource.

As the condition (e.g., offset) for the radio terminal 3 to exit a conditional handover, the same condition may be configured for a plurality of conditional handover execution conditions, or different conditions may be configured for them. Similarly, as the value of the validity timer, the same value may be configured for a plurality of conditional handover execution conditions, or different values may be configured for them.

In a conditional handover (CHO), when the radio terminal 3 fails (e.g., detects a Handover failure) in a handover to a candidate cell that satisfies an execution condition (e.g., threshold value), the radio terminal 3 may execute (continue) the conditional handover by switching (falling back) to another candidate cell that satisfies the condition.

If the radio terminal 3 receives a handover command that includes no CHO execution condition (e.g., threshold) (i.e., a command for a normal handover) from the RAN node 1 during a period after receiving a handover command that includes a CHO execution condition (e.g., threshold) from the source RAN node 1 and before any candidate target cell meets the execution condition, the radio terminal 3 may execute a normal handover, according to the received handover command including no CHO execution condition (e.g., threshold). The normal handover command including no CHO execution condition may be, for example, a mobilityControlInfo IE. In this case, the radio terminal 3 may release the previously received CHO execution condition (e.g., threshold) in response to receiving the handover command including no CHO execution condition (e.g., threshold).

Each of the above-described embodiments may be used individually or two or more embodiments may be appropriately combined with one another. For example, the second embodiment does not necessarily require the improvements described in the first embodiment or the improvements described in the third embodiment. Similarly, the third embodiment does not necessarily require the improvements described in the first embodiment or the improvements described in the second embodiment. In other words, the first to third embodiments can be used independently of each other and contribute to solving different objects or problems from each other, as well as contributing to achieving effects different from each other.

In the 5G system (e.g., NR) used as one of the application examples of the above-described embodiments, an RRC reconfiguration that involves a synchronization procedure (e.g., random access) with a target cell (of the RRC reconfiguration) like a handover is also referred to as a Reconfiguration with sync (or Reconfiguration with synchronization). That is, the conditional handover corresponds to (or includes) a conditional Reconfiguration with sync.

The functions described as the conditional handover (CHO) in the above-described embodiments may be referred to as a pre-conditioned HO, a prepared HO, a delayed HO, or the like.

The handovers (or the reconfigurations with sync), including normal handovers and conditional handovers, described in the above embodiments may be, for example, but not limited to, an inter-gNB handover, an intra-gNB (inter-gNB-DU) handover, a handover between a gNB and an eNB/5GC (ng-eNB), an inter-eNB/5GC handover, or an intra-eNB/5GC (inter-eNB/5GC-DU) handover.

The conditional handovers described in the above embodiments may be a conditional intra-DU (e.g., intra-gNB-DU or intra-eNB-DU) handover. In the conditional intra-DU handover, at least one of the plurality of candidate target cells is a cell served by the same gNB-DU (or eNB-DU) as the source cell. In this case, the UE CONTEXT SETUP REQUEST and UE CONTEXT RESPONSE messages between the CU (e.g., gNB-CU) and DU (e.g., gNB-DU) of the target RAN node may be UE CONTEXT MODIFICATION REQUEST and UE CONTEXT MODIFICATION RESPONSE messages, respectively.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; power transmission equipment; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017 Jan. 13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A target radio access network node comprising:

at least one memory; and at least one processor coupled to the at least one memory and configured to, during a mobility procedure for moving a radio terminal from a source cell to one of a plurality of candidate target cells, transmit to the radio terminal, via a source RAN node managing the source cell, a first configuration common to the plurality of candidate target cells and a plurality of second configurations each associated with a respective one of the plurality of candidate target cells, wherein the first configuration includes at least one configuration parameter for enabling the radio terminal to access to one of the plurality of candidate target cells or to communicate therein, and each second configuration includes at least one configuration parameter for enabling the radio terminal to access to the corresponding candidate target cell or to communicate therein.

(Supplementary Note 2)

The target radio access network node according to Supplementary Note 1, wherein the at least one configuration parameter included in the first configuration relates to a configuration of a radio bearer.

(Supplementary Note 3)

The target radio access network node according to Supplementary Note 1 or 2, wherein the at least one configuration parameter included in the first configuration includes a parameter for one or both of a Packet Data Convergence Protocol (PDCP) and a Service Data Adaptation Protocol (SDAP).

(Supplementary Note 4)

The target radio access network node according to any one of Supplementary Notes 1 to 3, wherein the at least one configuration parameter included in the first configuration includes system information.

(Supplementary Note 5)

The target radio access network node according to any one of Supplementary Notes 1 to 4, wherein the at least one configuration parameter included in each second configuration relates to a configuration of at least one of a cell group, a logical channel, or a random access.

(Supplementary Note 6)

The target radio access network node according to any one of Supplementary Notes 1 to 5, wherein the at least one configuration parameter included in each second configuration includes a parameter for a Medium Access Control (MAC) entity.

(Supplementary Note 7)

The target radio access network node according to any one of Supplementary Notes 1 to 6, wherein the mobility procedure includes at least one of a handover procedure, a procedure for changing a secondary node (SN) in Dual Connectivity (DC) (SN Change), or a procedure for changing a primary cell of a secondary cell group (PSCell Change).

(Supplementary Note 8)

The target radio access network node according to any one of Supplementary Notes 1 to 7, wherein the mobility procedure includes a handover procedure, and the at least one processor is configured to include both the first configuration and the second configurations in a handover acknowledge message to be sent from the target radio access network node to the source radio access network node.

(Supplementary Note 9)

The target radio access network node according to any one of Supplementary Notes 1 to 8, wherein the mobility procedure is a conditional mobility procedure.

(Supplementary Note 10)

A radio terminal comprising:

at least one memory; and at least one processor coupled to the at least one memory and configured to, during a mobility procedure for moving a radio terminal from a source cell to one of a plurality of candidate target cells, receive from a target RAN node managing the plurality of candidate target cells, via a source RAN node managing the source cell, a first configuration common to the plurality of candidate target cells and a plurality of second configurations each associated with a respective one of the plurality of candidate target cells, wherein the first configuration includes at least one configuration parameter for enabling the radio terminal to access to one of the plurality of candidate target cells or to communicate therein, and each second configuration includes at least one configuration parameter for enabling the radio terminal to access to the corresponding candidate target cell or to communicate therein.

(Supplementary Note 11)

The radio terminal according to Supplementary Note 10, wherein the at least one configuration parameter included in the first configuration relates to a configuration of a radio bearer.

(Supplementary Note 12)

The radio terminal according to Supplementary Note 10 or 11, wherein the at least one configuration parameter included in the first configuration includes a parameter for one or both of a Packet Data Convergence Protocol (PDCP) and a Service Data Adaptation Protocol (SDAP).

(Supplementary Note 13)

The radio terminal according to any one of Supplementary Notes 10 to 12, wherein the at least one configuration parameter included in the first configuration includes system information.

(Supplementary Note 14)

The radio terminal according to any one of Supplementary Notes 10 to 13, wherein the at least one configuration parameter included in each second configuration relates to a configuration of at least one of a cell group, a logical channel, or a random access.

(Supplementary Note 15)

The radio terminal according to any one of Supplementary Notes 10 to 14, wherein the at least one configuration parameter included in each second configuration includes a parameter for a Medium Access Control (MAC) entity.

(Supplementary Note 16)

The radio terminal according to any one of Supplementary Notes 10 to 15, wherein the mobility procedure is a conditional mobility procedure.

(Supplementary Note 17)

A method for a target radio access network node, the method comprising:

during a mobility procedure for moving a radio terminal from a source cell to one of a plurality of candidate target cells, transmitting to the radio terminal, via a source RAN node managing the source cell, a first configuration common to the plurality of candidate target cells and a plurality of second configurations each associated with a respective one of the plurality of candidate target cells, wherein the first configuration includes at least one configuration parameter for enabling the radio terminal to access to one of the plurality of candidate target cells or to communicate therein, and each second configuration includes at least one configuration parameter for enabling the radio terminal to access to the corresponding candidate target cell or to communicate therein.

(Supplementary Note 18)

A method for a radio terminal, the method comprising:
during a mobility procedure for moving a radio terminal from a source cell to one of a plurality of candidate target cells, receiving from a target RAN node managing the plurality of candidate target cells, via a source RAN node managing the source cell, a first configuration common to the plurality of candidate target cells and a plurality of second configurations each associated with a respective one of the plurality of candidate target cells, wherein
the first configuration includes at least one configuration parameter for enabling the radio terminal to access to one of the plurality of candidate target cells or to communicate therein, and
each second configuration includes at least one configuration parameter for enabling the radio terminal to access to the corresponding candidate target cell or to communicate therein.

(Supplementary Note 19)

A program for causing a computer to perform a method for a target radio access network node, the method comprising:
during a mobility procedure for moving a radio terminal from a source cell to one of a plurality of candidate target cells, transmitting to the radio terminal, via a source RAN node managing the source cell, a first configuration common to the plurality of candidate target cells and a plurality of second configurations each associated with a respective one of the plurality of candidate target cells, wherein
the first configuration includes at least one configuration parameter for enabling the radio terminal to access to one of the plurality of candidate target cells or to communicate therein, and
each second configuration includes at least one configuration parameter for enabling the radio terminal to access to the corresponding candidate target cell or to communicate therein.

(Supplementary Note 20)

A program for causing a computer to perform a method for a radio terminal, the method comprising:
during a mobility procedure for moving a radio terminal from a source cell to one of a plurality of candidate target cells, receiving from a target RAN node managing the plurality of candidate target cells, via a source RAN node managing the source cell, a first configuration common to the plurality of candidate target cells and a plurality of second configurations each associated with a respective one of the plurality of candidate target cells, wherein
the first configuration includes at least one configuration parameter for enabling the radio terminal to access to one of the plurality of candidate target cells or to communicate therein, and
each second configuration includes at least one configuration parameter for enabling the radio terminal to access to the corresponding candidate target cell or to communicate therein.

This application is based upon and claims the benefit of priority from Japanese Patent Application No. 2019-003561, filed on Jan. 11, 2019, the disclosure of which is incorporated herein in its entirety by reference.

REFERENCE SIGNS LIST

1 Radio Access Network Node
2 Radio Access Network Node
3 Radio Terminal
11 Source Cell
21-23 Candidate Target Cells
25 Central Unit (CU)
26 Distributed Unit (DU)
804 Processor
805 Memory
806 Modules
903 Baseband Processor
904 Application Processor
906 Memory
907 Modules

What is claimed is:

1. A method performed by a user equipment (UE), the method comprising:
receiving from a source radio access network (RAN) node a first message including a plurality of radio resource configurations, each for a respective one of a plurality of conditional handover candidate cells; and
after completion of a conditional handover from the source RAN node to a target RAN node controlling a target cell, which is one of the plurality of conditional handover candidate cells, releasing remaining one or more radio resource configurations for remaining one or more conditional handover candidate cells other than the target cell from the plurality of radio resource configurations.

2. The method according to claim 1, wherein the first message further includes a conditional handover (CHO) condition, the method further comprising, if the UE receives a normal handover command with no CHO condition after receiving the first message but before the CHO condition is satisfied, executing a handover based on the normal handover command.

* * * * *